United States Patent
Uemura et al.

(10) Patent No.: US 10,281,345 B2
(45) Date of Patent: May 7, 2019

(54) STRAIN SENSOR AND RECORDING MEDIUM

(71) Applicant: Konica Minolta, Inc., Chiyoda-ku, Tokyo (JP)

(72) Inventors: Hideo Uemura, Hachioji (JP); Kazuki Ikeda, Hachioji (JP); Makoto Ooki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 15/793,348

(22) Filed: Oct. 25, 2017

(65) Prior Publication Data

US 2018/0113036 A1    Apr. 26, 2018

(30) Foreign Application Priority Data

Oct. 25, 2016 (JP) .................................. 2016-208252

(51) Int. Cl.
*G01L 1/24* (2006.01)
*G01B 11/16* (2006.01)

(52) U.S. Cl.
CPC .............. *G01L 1/241* (2013.01); *G01B 11/16* (2013.01); *G01B 11/18* (2013.01)

(58) Field of Classification Search
CPC .................................. G01B 11/16; G01B 11/18

USPC ........................................................... 356/320
See application file for complete search history.

(56) References Cited

U.S. PATENT DOCUMENTS 8,810,780 B1 *  8/2014  Barcelo ................... G01L 1/241
                                                      356/32
9,423,243 B1 *  8/2016  Ikeda ..................... G01B 11/168

FOREIGN PATENT DOCUMENTS

| JP | 2005114702 A | 4/2005 |
| JP | 2006028202 A | 2/2006 |
| JP | 2016156763 A | 9/2016 |

* cited by examiner

*Primary Examiner* — Hina F Ayub
(74) *Attorney, Agent, or Firm* — Cantor Colburn LLP

(57) ABSTRACT

A strain sensor includes a marker, detectors and a calculator. The marker is disposed on a surface of a measurement object and includes a strain body and surface plasmon generating particles. In the strain body, a strain is formed by a load. The surface plasmon generating particles are arranged in two directions which are parallel to two in-plane directions of a light receiving surface of the strain body. The first detector detects a spectral intensity of a light which has been reflected on the marker or has passed through the marker. The second detector detects absorption spectral peaks corresponding to the respective array directions of the particles from the spectral intensity. The calculator calculates the quantity of the strain of the marker based on a difference in wavelength of the two absorption spectral peaks.

20 Claims, 5 Drawing Sheets

STRAIN SENSOR AND RECORDING MEDIUM

BACKGROUND

Cross Reference to Related Applications

The present invention claims priority under 35 U.S.C. § 119 to Japanese Application Patent Application No. 2016-208252 filed on Oct. 25, 2016, the entire content of which is incorporated herein by reference.

1. Technological Field

The present invention relates to a strain sensor and a recording medium.

2. Description of the Related Art

In recent years, there has been an increasing need for visualization of a variety of physical quantities (e.g. displacement, load, acceleration and the like) acting on a measurement object.

One of techniques that are known in the art that meet this need is to use a structural color changeable material that changes its color according to a strain (e.g. see JP 2006-28202A). This material can change its color according to a strain since nanosized mono-dispersed particles are three-dimensionally arranged in a rubber elastic body (elastomer). To be more specific, the spacing of the lattice planes of the particles is changed according to a strain of the material, which shifts the wavelength λ of Bragg reflection and changes the color of the material accordingly. Since the material changes its color sensitively to a local strain, users can intuitively understand the strain of the material by visual observation. Therefore, the material is expected to be applied to films and fibers as a sensor material that visualizes stress concentration or strain.

In the field of sensors that visualize stress concentration or strain, it has been particularly required to develop a sensor that can used in a minute area. Further, in the field of measurement of strain, it has been required to develop a sensor that can measure a strain in a minute area. A type of such sensors known in the art that can be used in a minute area is strain sensors by means of localized surface plasmon phenomenon. For example, one of strain sensors known in the art measures a strain or a stress by using a technique in which a nano-order periodic structure is formed in a metal thin film marker, and the marker is pasted on a measurement object.

A plasmon-type strain sensor is constituted by a reversibly deformable elastic material in which plasmon generating nanosized particles are two-dimensionally arranged parallel to in-plane directions in a periodic manner. Accordingly, compared to Bragg reflection-type sensors, the sensor body can be formed thinner as a whole (i.e. in a thinner film shape) and offer the improved sensitivity of the wavelength shift to a strain in the in-plane direction.

However, a problem with such localized surface plasmon-type strain sensors is such that they are also sensitive to a change of refractive index caused by a temperature change, and the effect of strain and the effect of temperature change are mixed and inseparable from each other. This is because the plasmon resonance wavelength depends on two factors of the difference in refractive index between the nanoparticles and the surrounding thereof, and the spacing between the nanoparticles. That is, when a resonance wavelength shift is caused by a strain, the spacing between nanoparticles are changed so that the strain is detected. On the other hand, when the temperature is changed, a resonance wavelength shift is caused not only by a change of the particle spacing according to the linear expansion of the elastic material but also by a change of the refractive index of the nanoparticles and the elastic body. That is, since a resonance wavelength shift is caused based on the common principle, it has been difficult to calculate the quantity of a strain by measuring the resonance wavelength shift.

SUMMARY

The present invention has been made in view of the above circumstances, and an object thereof is to provide a strain sensor and a recording medium which offer the improved accuracy of measuring the quantity of strain by eliminating the effect of a temperature change.

To achieve at least one of the abovementioned objects, according to an aspect of the present invention, there is provided a strain sensor, including:

a marker which is disposed on a surface of a measurement object and which includes:
  a strain body in which a strain is formed by a load; and
  surface plasmon generating particles which are regularly arranged at same spacings in two directions which are parallel to two in-plane directions of a light receiving surface of the strain body;
a first detector which detects a spectral intensity of a light which has been reflected on the marker or has passed through the marker;
a second detector which detects absorption spectral peaks corresponding to the respective array directions of the particles from the spectral intensity detected by the first detector; and
a calculator which calculates the quantity of the strain of the marker based on a difference in wavelength of the two absorption spectral peaks detected by the second detector.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DETAILED DESCRIPTION OF EMBODIMENTS

Figure 1:
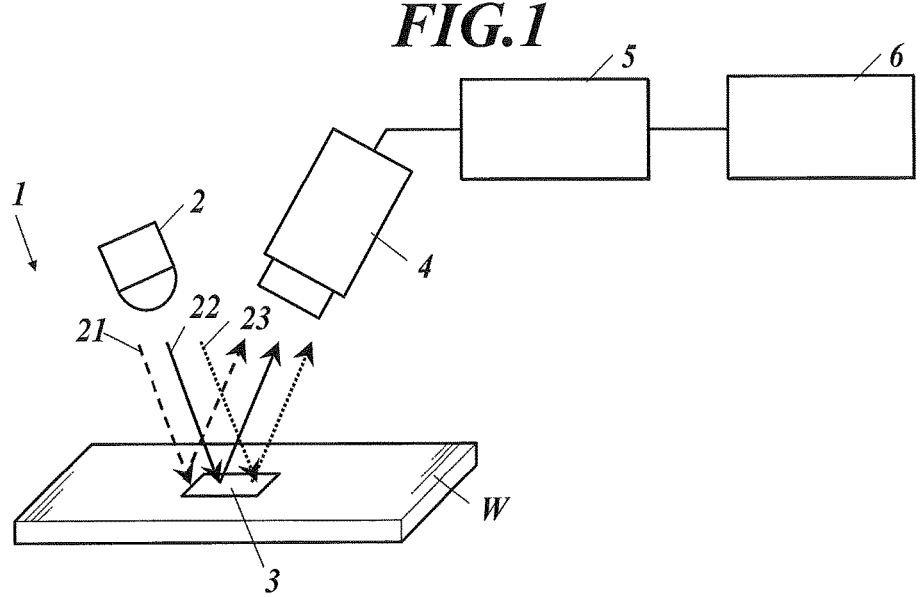
FIG. 1 illustrates the schematic configuration of a strain sensor according to an embodiment of the present invention.

Hereinafter, one or more embodiments of the present invention will be described in detail with reference to the drawings. However, the scope of the invention is not limited to the disclosed embodiments. In the following description, the left-right direction and the up-down direction in FIG. 1 are referred to respectively as the Y direction and the Z direction, and the direction (front-back direction) perpendicular to the Y direction and the Z direction is referred to as the X direction.

Structure of Strain Sensor

A strain sensor 1 according to an embodiment of the present invention can measure the strain of a measurement object W by use of light. As illustrated in FIG. 1, the strain sensor 1 includes a light source 2, a marker 3 that is fixed on the upper face of the measurement object W disposed below the light source 2 in the Z direction and that reflects light emitted from the light source 2, a detector 4 that is disposed above the measurement object W in the Z direction to detect reflection light from the marker 3, a signal processor 5 that measures the strain of the measurement object W based on the light detected by the detector 4, and a storage 6.

The light source 2 emits different linearly polarized beams 21 to 23 toward the marker 3 that is fixedly disposed below. The beams 21 to 23 are polarized in a direction parallel to the light receiving surface of the marker 3. In the embodiment, the beams that are emitted from the light source 2 are linearly polarized parallel to the array directions of particles 32 (see FIG. 2) of the marker 3. Instead of providing the light source 2 that emit beams linearly polarized parallel to the array directions of the particles 32, a polarization filter may be provided in the light path, for example, in front of the light receiving portion of the detector 4.

As illustrated in FIG. 2, the marker 3 includes a film strain body 31 in which a strain is produced by a load, and the surface plasmon generating particles 32 that are regularly arranged in or on the strain body 31.

The strain body 31 is constituted by an approximately square plate member of an elastic material. Examples of the elastic material of the strain body 31 include flexible and transparent elastomers such as acrylic rubbers (i.e. crosslinked polyethyl acrylate) and the like.

The particles 32 contains at least a metal. Examples of the metal of the particles 32 include gold, silver, titanium and the like. Gold and silver are preferably used since they have an absorption spectral peak of the surface plasmon in the visible region, which makes recognition by human eyes or procurement of the light source 2 and the detector 4 easier.

The particles 32 are not limited to the above-described configuration of containing at least a metal and may contain at least an oxide semiconductor instead. In this case, examples of the oxide semiconductor of the particles 32 include zinc oxide and the like. When zinc oxide is used, it is possible to carry out a measurement in a dark environment and to eliminate the influence of environmental light since zinc oxide has an absorption spectral peak of the surface plasmon in the near-infrared region. Furthermore, zinc oxide is inexpensive and can be readily formed into nanoparticles.

The size of the particles 32 is equal to or less than the wavelength of the light that is emitted from the light source 2 and incident to the marker 3. When the size of the particles 32 is equal to or less than the wavelength of the incident light to the marker 3, surface plasmon can be generated.

The particles 32 are regularly arranged at the same spacings in two directions which are parallel to two in-plane directions of the reflection surface of the incident light (light receiving surface of the marker 3). In the embodiment, the particles 32 are arranged in the mutually perpendicular X and Y two directions. Further, the particles 32 are periodically arranged only in in-plane directions.

Figure 2A:
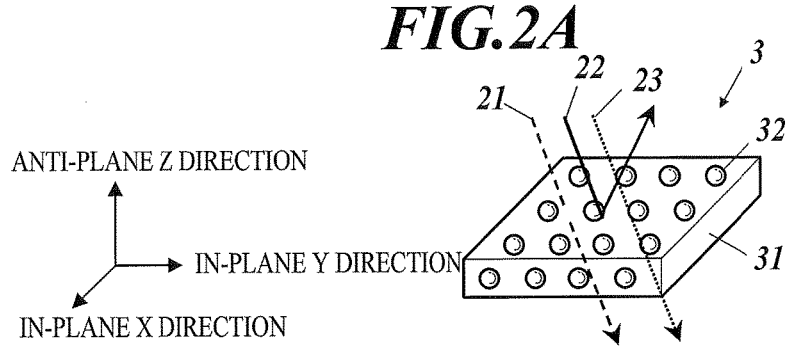
FIG. 2A illustrates an example of the state in which a strain body does not have a strain.
Figure 2B:
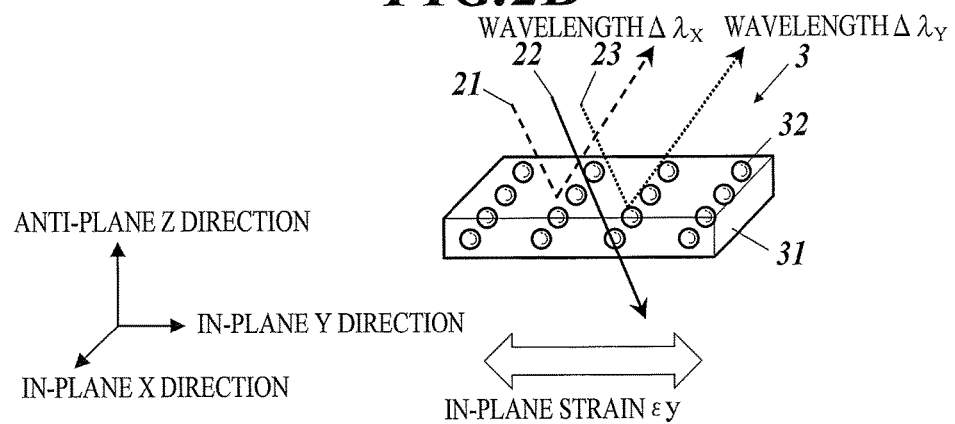
FIG. 2B illustrates an example of the state in which a strain body has a strain in the in-plane Y direction.

FIG. 2A and FIG. 2B illustrate an example in which the beams 21 to 23 with different wavelengths are incident in the anti-plane Z direction to the surface of the strain body 31.

FIG. 2A illustrates an example of the state in which the strain body 31 has no strain. In this state, surface plasmon is generated by the interaction between the particles 32 and the light (beams 21 to 23) so that only the beam 22 with a specific wavelength is reflected.

FIG. 2B illustrates an example of the state in which the strain body 31 has a strain $\varepsilon y$ in the in-plane Y direction. In this state, the spacing of the particles 32 is changed in both in-plane X and Y directions according to the strain $\varepsilon y$. To be more specific, the spacing of the particles 32 is expanded in the Y direction, which is the direction of the strain, while the spacing of the particles 32 is narrowed in the X direction, which is perpendicular to the direction of the strain. Accordingly, the resonance wavelength of the surface plasmon is shifted, and the reflection wavelength is changed. As a result, the beam 22 is not reflected any more while the beams 21, 23 with different specific wavelengths from the beam 22 are reflected as illustrated in FIG. 2B.

That is, the in-plane strain $\varepsilon y$ causes wavelength shifts $\Delta\lambda_X$ and $\Delta\lambda_Y$ corresponding to the array directions of the particles 32, which makes it possible to detect the strain. Specifically, the signal processor 5 determines that a strain is detected when it determines that the wavelength shift $\Delta\lambda_X$ corresponding to the X direction is not equal to the wavelength shift $\Delta\lambda_Y$ corresponding to the Y direction ($\Delta\lambda_X \neq \Delta\lambda_Y$).

The detector 4 receives the light (beams 21 to 23) reflected on the marker 3 and detects the spectral intensity thereof. The spectral intensity of the light detected by the detector 4 is output to the signal processor 5. That is, the detector 4 functions as a first detector of the present invention.

The signal processor 5 detects the absorption spectral peaks corresponding to the respective array directions of the particles 32 based on the spectral intensity of the light output from the detector 4. Then, the signal processor 5 calculates the quantity of strain of the marker 3 based on the difference in wavelength of the detected absorption spectral peaks. That is, the signal processor 5 functions as a second detector and a calculator of the present invention.

The storage 6 is constituted by an HDD (Hard Disk Drive), a semiconductor memory or the like. In the storage 6, program data and a variety of setting data are stored in a readable and writable manner by the signal processor 5. The storage 6 also stores an initial peak wavelength $\Delta\lambda_{X1}$ ($=\Delta\lambda_{Y1}$) corresponding to the array directions the particles of the marker 3.

Hereinafter, the arrangement of the particles 32 and the reflection light spectral intensities corresponding to the directions of the arrangement will be described referring to FIG. 3A to FIG. 5B. In the example illustrated in FIG. 3A to FIG. 5B, the reflection light spectral intensities were simulated in the conditions in which the material of the strain body 31 is silicone rubber, the material of the particles 32 is spherical gold (Au) with a diameter of 100 nm. The particles 32 is not limited to a spherical shape but may have any shape that can cause polarization in the in-plane direction such as columnar shape (nanorods).

Reference State

Figure 3A:
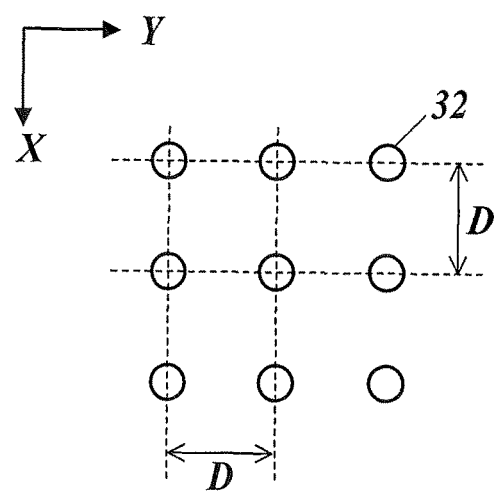
FIG. 3A illustrates the arrangement of particles in a reference state.
Figure 3B:
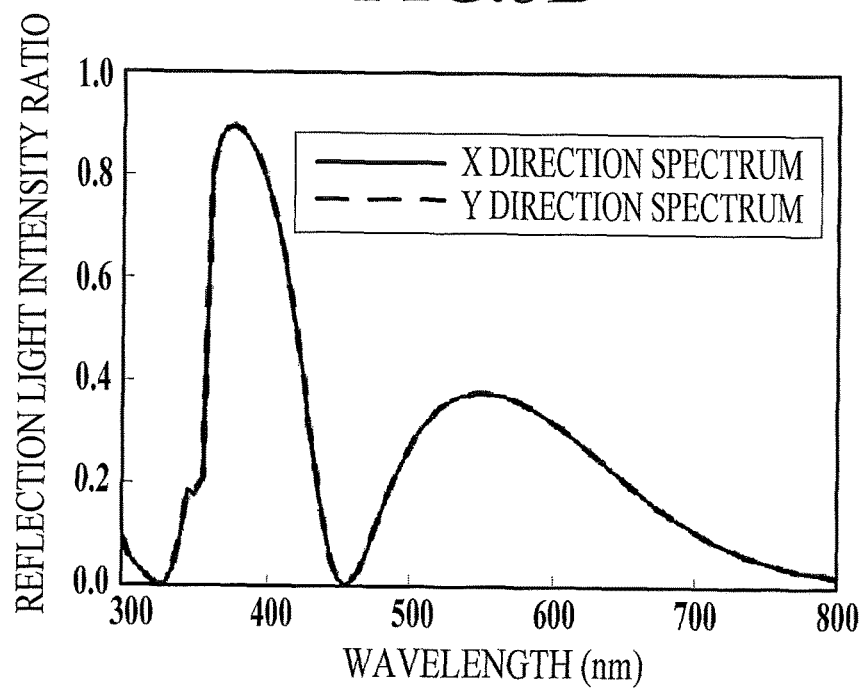
FIG. 3B illustrates the reflection light spectral intensities corresponding to respective array directions of particles in a reference state.

FIG. 3A illustrates the arrangement of the particles 32 in a reference state, and FIG. 3B illustrates the reflection light spectral intensities corresponding to the respective array directions of the particles 32 in the reference state. As used herein, a reference state refers to the state in which the marker 3 neither has a strain nor experiences a temperature change.

As illustrated in FIG. 3A, the particles 32 are arranged in the X direction and the Y direction respectively at spacings D in the reference state.

As illustrated in FIG. 3B, the spectrums of the respective array directions (X and Y directions) of the particles 32 in the reference state is coincide with each other since the particle spacings are equal in the X and Y direction.

When Strain is Produced

Figure 4A:
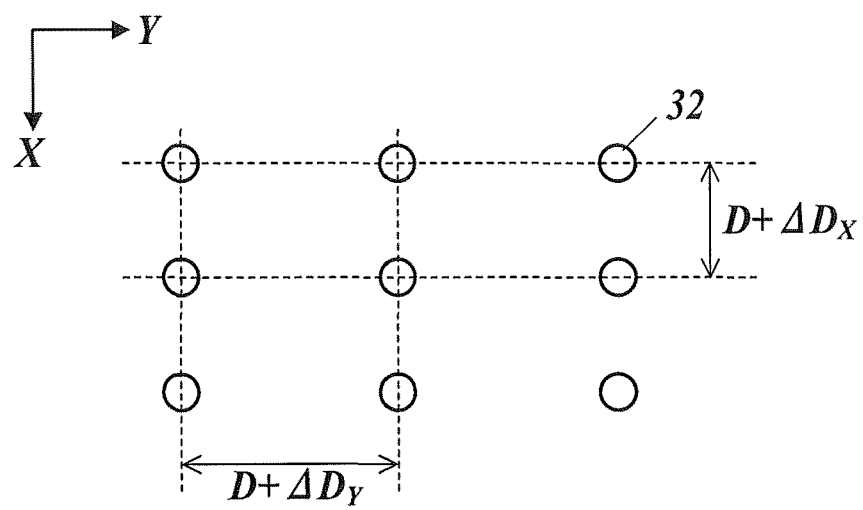
FIG. 4A illustrates the arrangement of particles when a strain is produced.
Figure 4B:
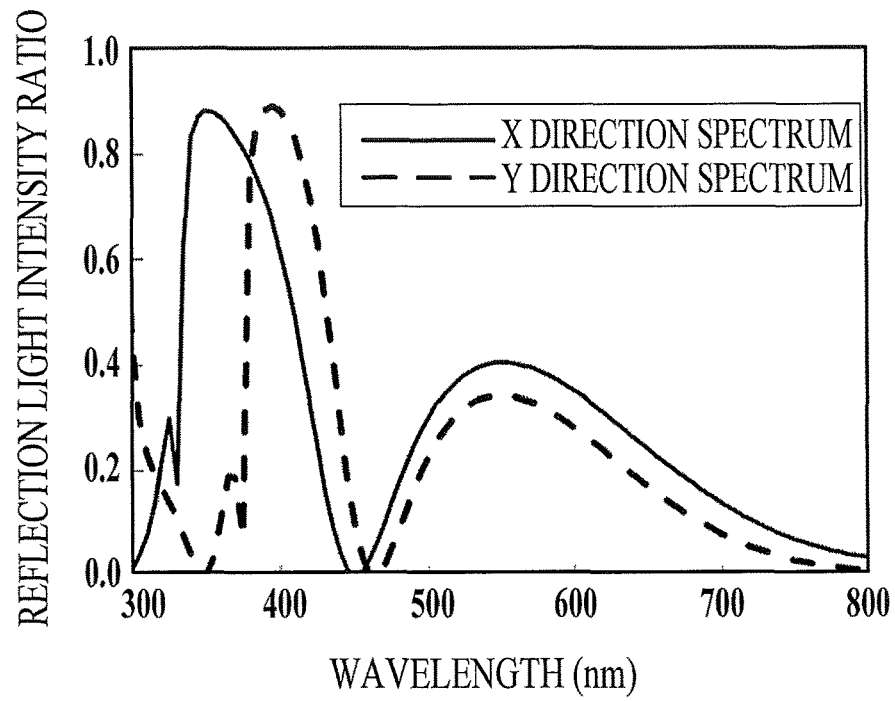
FIG. 4B illustrates the reflection light spectral intensities corresponding to respective array directions of particles when a strain is produced.

FIG. 4A illustrates the arrangement of the particles 32 when a strain is produced, and FIG. 4B illustrates the reflection light spectral intensities corresponding to the array directions of the particles 32 when a strain is produced. In the example illustrated in FIG. 4A and FIG. 4B, a compression force in the X direction or a stretching force (tensile stress) in the Y direction is acting on the marker 3 so that a strain is produced in the Y direction.

As for the particles 32 in a state in which a strain is produced, the particle spacing in the Y direction, which is the direction of the strain, is wider ($D+\Delta D_Y$) than in the reference state while the particle spacing in the X direction, which is perpendicular to the direction of the strain, is narrower ($D+\Delta D_X$) than in the reference state as illustrated in FIG. 4A. $\Delta D_x$ and $\Delta D_Y$ are each a positive or negative value. In the illustrated example, $\Delta D_x$ is a positive value, and $\Delta D_Y$ is a negative value.

As for the spectrums of the respective array directions (X and Y directions) of the particles 32 in the state in which a strain is produced, the reflection light spectrums of the strain body 31 containing the particles 32 are changed corresponding to the array directions, and the peak wavelengths are shifted corresponding to the array directions accordingly as illustrated in FIG. 4B since the change of the particle spacing causes a change of the resonance wavelength of the surface plasmon. In the example illustrated in FIG. 4B, the spectrum of the X direction is shifted to a shorter wavelength while the spectrum of the Y direction is shifted to a longer wavelength. That is, in the example illustrated in FIG. 4B, since the wavelength shift $\Delta\lambda_X$ of the X direction is not equal to the wavelength shift $\Delta\lambda_Y$ of the Y direction ($\Delta\lambda_X \neq \Delta\lambda_X$), it can be determined that a strain is produced.

When Temperature is Changed

Figure 5A:
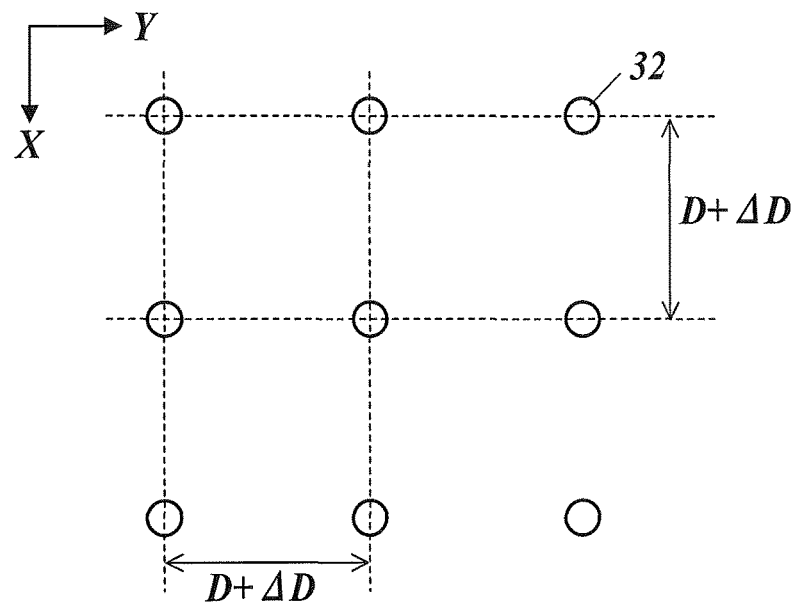
FIG. 5A illustrates the arrangement of particles when the temperature is changed (increased)
Figure 5B:
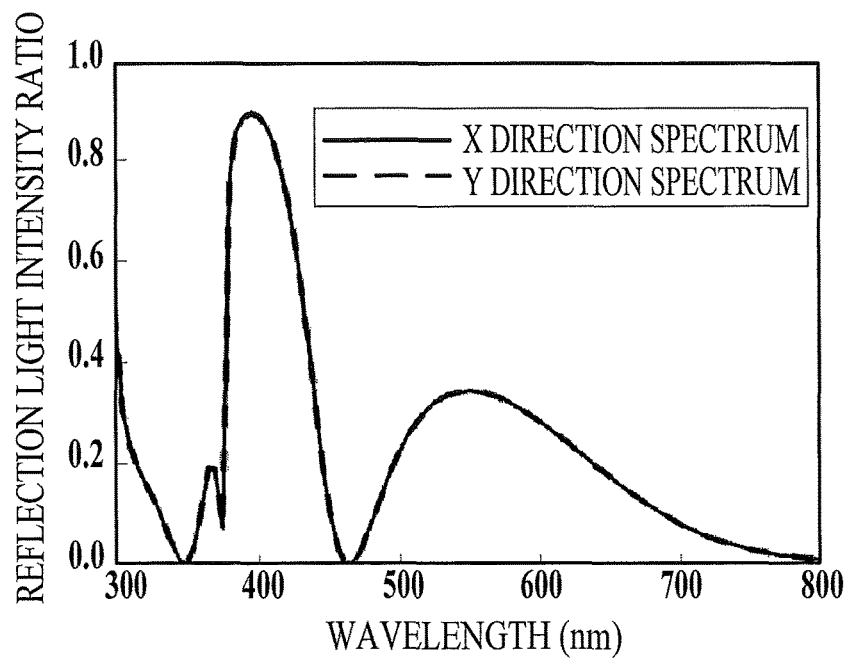
FIG. 5B illustrates the reflection light spectral intensities corresponding to respective array directions of particles when the temperature is changed (increased)

FIG. 5A illustrates the arrangement of the particles 32 when the temperature is changed (increased), and FIG. 5B illustrates the reflection light spectral intensities corresponding to the respective array directions of the particles 32 when the temperature is changed (increased).

As for the particles 32 in the state in which the temperature is changed (increased), the entire marker 3 is expanded isotropically according to the linear expansion coefficient of the strain body 31 due to the temperature increase. Accordingly, the particle spacing is increased by $+\Delta D$ from the reference state (i.e. the particle spacing is $D+\Delta D$) in both X and Y directions as illustrated in FIG. 5A.

As for the spectrums of the respective array directions (X and Y directions) of the particles 32 in the state in which the temperature is changed (increased), the entire absorption spectrums are offset while the peaks thereof remain coincide with each other as illustrated in FIG. 5B since there is no difference in the particle spacing between the X direction and the Y direction. That is, in the example illustrated in FIG. 5B, since the wavelength shift $\Delta\lambda_X$ of the X direction is equal to the wavelength shift $\Delta\lambda_Y$ of the Y direction ($\Delta\lambda_X = \Delta\lambda_X$), it can be determined that no strain is produced.

Further, the amount of change in the refractive index of the strain body 31 can be calculated from the amount of the offset of the absorption spectrums, and the amount of change in the temperature (hereinafter referred to as a temperature change) can be calculated from the amount of change in the refractive index. In this regard, the temperature change $\Delta T$ can be represented by the equation (1) using a coefficient $\beta$.

$$\Delta T = \beta \times \Delta\lambda_T \qquad (1)$$

where $\Delta\lambda_T$ is the offset of the spectrum peak, $\Delta n$ is the change of the refractive index, and $\Delta T$ is the temperature change.

The coefficient $\beta$ is the sensitivity of the wavelength shift to the temperature change, which can be determined based on the wavelength dependency and the temperature dependency of the refractive index. In the conditions of this simulation, the coefficient $\beta$ can be calculated as $\beta = 0.013$ $[dn/d\lambda] \times 936.04[dt/dn] = 12.00[dt/d\lambda]$, where dn, d$\lambda$ and dt are the respective units of $\Delta n$, $\Delta\lambda$ and $\Delta T$.

Method of Producing Marker

Methods of forming a nanosized device can be classified into mainly two types of a top-down type and a bottom-up type. The top-down type is a production technique for fine processing that has been used in semiconductor processes such as lithography and nanoimprinting. The top-down type is advantageous in high design flexibility in the structure and the shape but disadvantageous in many technical constraints in the product size and the like. The bottom-up type is a technique of building a complex structure by a spontaneous process that is based on the inherent chemical bonding and the intermolecular force of atoms and molecules without an aid of any artificial manipulation or process. The bottom-up type is suitable for producing a structure that has a periodic pattern of several nm. However, this technique is disadvantageous in the difficulty in producing a non-periodic structure and the absence of established mass production techniques. The marker 3 of the present invention can be produced by either top-down type or bottom-up type method.

Operation of Strain Sensor

Next, the operation of the strain sensor 1 according to the embodiment will be described referring to the flowchart of FIG. 6.

First, the signal processor 5 retrieves the initial peak wavelength $\lambda_{X1}$ ($=\lambda_{Y1}$) of the particle array directions of the marker 3 stored in the storage 6 (Step S101).

Then, the signal processor 5 detects the peak wavelengths (absorption spectral peaks) $\lambda_{X2}$, $\lambda_{Y2}$ of the respective particle array directions based on the spectral intensity of the light (beam) detected by the detector 4 (Step S102).

The signal processor 5 then calculates the wavelength shift $\Delta\lambda_X$ ($=\lambda_{X2}-\lambda_{X1}$) of the X direction and the wavelength shift $\Delta\lambda_Y$ ($=\lambda_{Y2}-\lambda_{Y1}$) of the Y direction from the detected peak wavelengths $\lambda_{X2}$, $\lambda_{Y2}$ and the initial peak wavelengths $\lambda_{X1}$, $\lambda_{Y1}$ retrieved in Step S101 and thereafter corrects the initial peak wavelengths $\lambda_{X1}$, $\lambda_{Y1}$ by the average shift (equal to the offset $\Delta\lambda_T$) of the wavelength shift $\Delta\lambda_X$ of the X direction and the wavelength shift $\Delta\lambda_Y$ of the Y direction. Specifically, the corrected initial peak wavelengths $\lambda_{X1}$, $\lambda_{Y1}$ are calculated by adding the average shift of the wavelength shift $\Delta\lambda_X$ of the X direction and the wavelength shift $\Delta\lambda_Y$ of the Y direction to the respective initial peak wavelengths $\lambda_{X1}$, $\lambda_{Y1}$ retrieved in Step S101. When there is no change of temperature, it is not necessary to correct the initial peak wavelengths $\lambda_{X1}$, $\lambda_{Y1}$. However, even when the above correction is performed, the same result can be obtained since the average shift of the wavelength shift $\Delta\lambda_X$ of the X direction and the wavelength shift $\Delta\lambda_Y$ of the Y direction is zero.

Then, the signal processor 5 calculates the wavelength shift $\Delta\lambda_X$ of the X direction and the wavelength shift $\Delta\lambda_Y$ of the Y direction based on the initial peak wavelengths $\lambda_{X1}$, $\lambda_{Y1}$ corrected in Step S102 and the peak wavelengths $\lambda_{X2}$, $\lambda_{Y2}$ detected in Step S102 (Step S103). In this step, the wavelength shift $\Delta\lambda_X$ of the X direction and the wavelength shift $\Delta\lambda_Y$ of the Y direction can be calculated by the equations (2) and (3).

$$\Delta\lambda_X = \lambda_{X2} - \lambda_{X1}(=-(\lambda_{Y2}-\lambda_{X2})/2) \qquad (2)$$

$$\Delta\lambda_Y = \lambda_{Y2} - \lambda_{Y1}(=(\lambda_{Y2}-\lambda_{X2})/2) \qquad (3)$$

As shown in the equations, the wavelength shift $\Delta\lambda_X$ of the X direction and the wavelength shift $\Delta\lambda_Y$ of the Y direction are calculated based on the difference in wavelength $(\lambda_{Y2}-\lambda_{X2})$ between the peak wavelengths $\lambda_{X2}$, $\lambda_{Y2}$ detected in Step S102. With this calculation, it is possible to cancel the wavelength shift (offset) caused by a change of temperature even when the change of temperature occurs at the same time with a production of a strain. Therefore, the effect of a change of temperature can be eliminated, and only the effect of a strain can be taken into consideration.

Then, the signal processor 5 makes a determination as to whether the wavelength shift $\Delta\lambda_X$ of the X direction and the wavelength shift $\Delta\lambda_Y$ of the Y direction calculated in Step S103 are different from each other ($\Delta\lambda_X \neq \Delta\lambda_Y$) (Step S104).

If it is determined that the wavelength shift $\Delta\lambda_X$ of the X direction and the wavelength shift $\Delta\lambda_Y$ of the Y direction are different from each other ($\Delta\lambda_X \neq \Delta\lambda_Y$) (Step S104, Yes), the signal processor 5 determines that a strain is produced (Step S105) since the particle spacing can be considered different between the X direction and the Y direction, and the process continues with Step S107.

If it is determined that the wavelength shift $\Delta\lambda_X$ of the X direction and the wavelength shift $\Delta\lambda_Y$ of the Y direction are equal ($\Delta\lambda_X = \Delta\lambda_Y$) (Step S104, No), the signal processor 5 determines that no strain is produced (Step S106) since the particle spacing can be considered equal in the X direction and the Y direction, and the process ends.

Then, the signal processor 5 specifies the direction of the strain detected in Step S105 (Step S107). Specifically, the signal processor 5 specifies the direction of the strain by comparing the wavelength shift $\Delta\lambda_X$ of the X direction with the wavelength shift $\Delta\lambda_Y$ of the Y direction calculated in Step S103. For example, if it is determined that $\Delta\lambda_X < \Delta\lambda_Y$, the signal processor 5 specifies the direction of the strain as the Y direction. If it is determined that $\Delta\lambda_X > \Delta\lambda_Y$, the signal processor 5 specifies the direction of the strain as the X direction.

Then, the signal processor 5 calculates the amount of the strain produced (quantity of strain) specified in Step S105 (Step S108). The quantity of strain ε can be represented by the equation (4).

$$\varepsilon = (D + \Delta D_X)/(D + \Delta D_Y) \qquad (4)$$

where D is the spacing of the particles 32 in the reference state, $\Delta D_X$ is the change of the particle spacing in the X direction, and $\Delta D_Y$ is the change of the particle spacing in the Y direction as illustrated in FIG. 4A.

$\Delta D_X$ and $\Delta D_Y$ can be represented by the equations (5) and (6) with the wavelength shifts $\Delta\lambda_X$, $\Delta\lambda_Y$ of the respective directions and a coefficient α.

$$\Delta D_X = \alpha \times \Delta\lambda_X \qquad (5)$$

$$\Delta D_Y = \alpha \times \Delta\lambda_Y \qquad (6)$$

where the coefficient α is the sensitivity of peak wavelength shift to a change of the particle spacing. In the conditions of the simulation, the coefficient α can be calculated as $\alpha = dD/d\lambda = 0.80$ (nm/λ).

By combining the above-described method of calculating the quantity of strain and the method of calculating a change of temperature (see equation (1)), the respective significances of contribution to the strain can be calculated even when a change of temperature and a production of strain occur at the same time.

As described above, the strain sensor 1 according to the embodiment includes:

the marker 3 which is disposed on the surface of the measurement object W and which includes: the strain body 31 in which a strain is produced by a load; and the surface plasmon generating particles 32 which are regularly arranged at the same spacings in two directions which are parallel to two in-plane directions of a light receiving surface of the strain body 31;

the first detector (detector 4) which detects the spectral intensity of the light that has reflected on the marker 3 or has passed through the marker 3;

the second detector (signal processor 5) which detects the absorption spectral peaks corresponding to the array directions of the particles 32 based on the spectral intensity detected by the first detector; and a calculator (signal processor 5) which calculates the quantity of the strain of the marker 3 from the wavelength difference between the two absorption spectral peaks detected by the second detector.

Therefore, with the strain sensor 1 according to the embodiment, the effect of a change of temperature can be eliminated, and only the effect of a strain can be taken into consideration by measuring the wavelength difference between the absorption spectrum peaks. As a result, the measurement accuracy of the quantity of strain can be improved.

In the strain sensor 1 according to the embodiment, the two directions are perpendicular to each other.

Therefore, in the strain sensor 1 according to the embodiment, the absorption spectrums corresponding to the respective two directions do not interfere with each other and have mutually independent sensitivity. As a result, the sensitivity to strain in the two directions can be maximized.

The strain sensor 1 according to the embodiment includes the light source 2 that emits light toward the marker 3.

Therefore, in the strain sensor 1 according to the embodiment, the influence of a change of the environmental light can be reduced, and the measurement can be performed with higher sensitivity.

In the strain sensor 1 according to the embodiment, the light source 2 emits the light which is linearly polarized parallel to the array directions of the particles 32.

In general, a polarization component that is parallel to the array directions of the particles 32 can form the sharpest peak of the absorption spectrum while the other polarization components unfavorably broaden the peak shape of the absorption spectrum.

That is, the maximum sensitivity to a change of the periodic spacing of the particles 32 can be achieved when the light emitted toward the marker 3 has only the linearly polarized component that is parallel to the array directions of the particles 32.

In the strain sensor 1 according to the embodiment, the maximum sensitivity to a change of the periodic spacing of the particles 32 can be achieved. Therefore, the sensitivity to detect the absorption spectral peaks can be improved.

In the strain sensor 1 according to the embodiment, the particles 32 contain at least a metal.

Therefore, the strain sensor 1 according to the embodiment can generate surface plasmon in the visible region. This enables detecting the spectrums with a widely-used typical spectrometer and reducing the cost.

In particular, in the strain sensor 1 according to the embodiment, the particles 32 contain at least gold or silver.

Therefore, the strain sensor 1 according to the embodiment can generate particularly strong surface plasmon in the visible region. This enables detecting the spectrums with a widely-used typical spectrometer and reducing the cost.

In the strain sensor 1 according to the embodiment, the particles 32 contain at least an oxide semiconductor.

Therefore, the strain sensor 1 according to the embodiment can generate surface plasmon in the near-infrared region. This enables detecting the spectrums even in a dark environment. As a result, the flexibility in measurement time and measurement site can be ensured.

In particular, in the strain sensor 1 according to the embodiment, the particles 32 contain at least zinc oxide.

Therefore, the strain sensor 1 according to the embodiment can generate particularly strong surface plasmon in the near-infrared region. This enables detecting the spectrums even in a dark environment. As a result, the flexibility in measurement time and measurement site can be ensured.

In the strain sensor 1 according to the embodiment, the strain body 31 is made of an elastic material.

Therefore, in the strain sensor 1 according to the embodiment, strain can be measured by using a reversibly deformable material, and the material is usable even after expansion and contraction are repeated. As a result, the cost for the measurement can be reduced.

In the strain sensor 1 according to the embodiment, the particles 32 are periodically arranged only in the in-plane directions.

Therefore, in the strain sensor 1 according to the embodiment, a change of color caused by the strain in the anti-plane direction of the strain body 31 can be reduced. As a result, the sensor can be insensitive to a deformation in the normal direction as well as temperature, and the noise can be further reduced.

While the present invention is specifically described with an embodiment, the present invention is not limited to the above-described embodiment, and changes can be made without departing from the features thereof.

For example, in the above-described embodiment, the sensor includes the light source 2 that emits light toward the marker 3. However, the present invention is not limited thereto. That is, the light source 2 is not an essential component of the present invention.

For example, the sensor may be configured to use natural light incident to the marker 3.

The above-described embodiment illustrates an exemplary configuration in which the beams 21 to 23 are emitted from the light source 2 and reflected on the marker 3.

However, the present invention is not limited thereto. For example, the strain body 31 and the measurement object W may be constituted by transparent bodies so that that the beams 21 to 23 emitted from the light source 2 pass through the marker 3 and the measurement object W. In this configuration, the detector 4 is disposed at the point where the beams 21 to 23 emitted from the light source 2 reach after passing through the marker 3 and the measurement object W, so as to detect the spectral intensity of the light that has passed through the marker 3.

As described above, the strain body 31 and the measurement object W may be constituted by transparent bodies, and the first detector (detector 4) may detect the spectral intensity of the light that has passed through the marker 3. This configuration enables measuring the quantity of strain by using the light that has passed through the marker 3 and the measurement object W. Therefore, the flexibility in the arrangement of the detector 4 and the like can be ensured.

When the strain body 31 and the measurement object W are constituted by transparent bodies, the particles 32 may be regularly arranged on the back face of the strain body 31.

Further, when the strain body 31 and the measurement object W are constituted by transparent bodies, a metal layer such as a silver layer may be provided on the back face of the strain body 31 so that the beams 21 to 23 emitted from the light source 2 are reflected on the metal layer after passing through the strain body 31 to the back face thereof. In this configuration, the surface plasmon can be generated twice during the transmission and after the reflection. This can further enhance the absorption spectral peaks, and the measurement accuracy can therefore be further improved.

Figure 6:
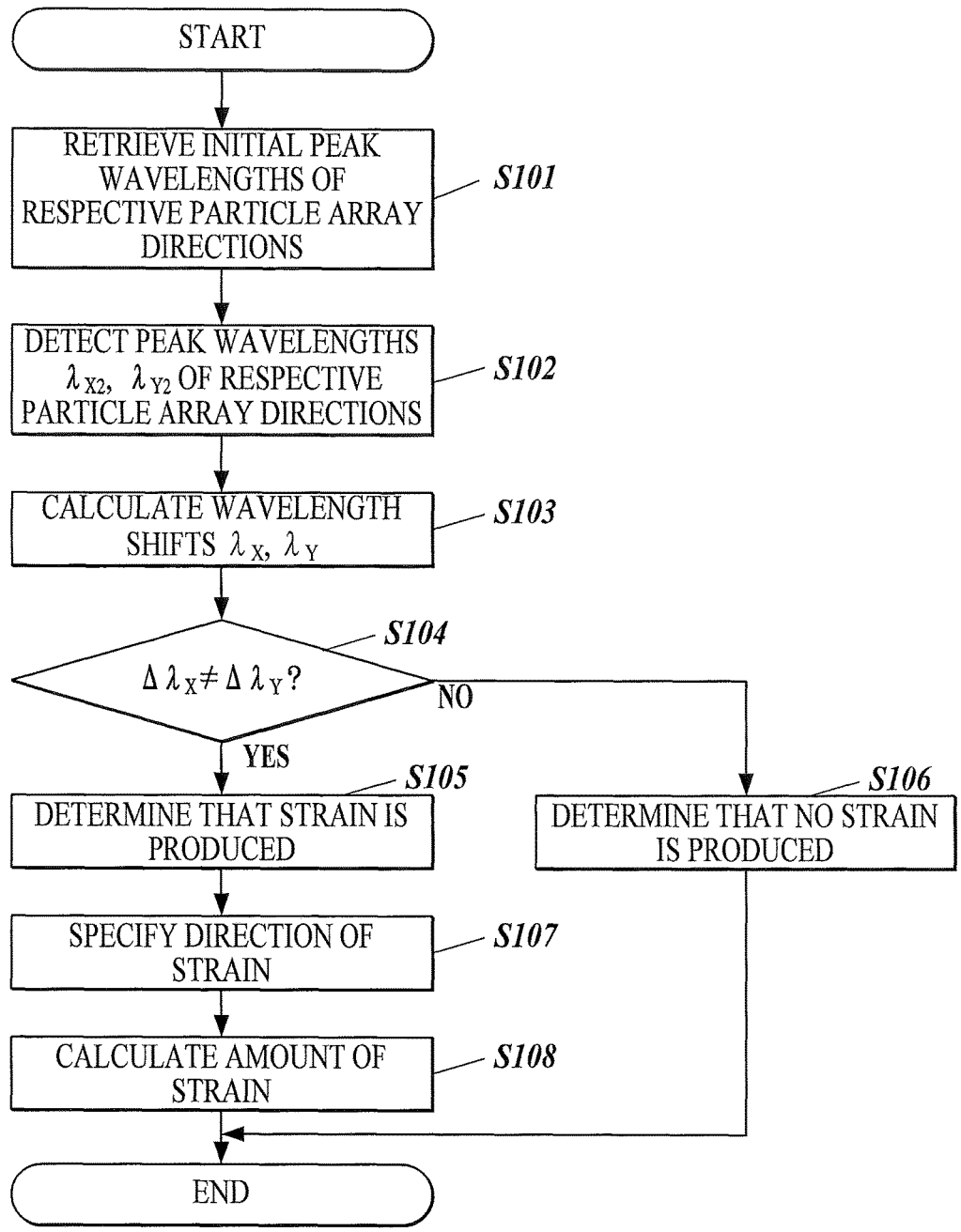
FIG. 6 is a flowchart of the operation of a strain sensor according to the present invention.

In the above-described embodiment, the initial peak wavelengths $\lambda_{X1}$ and $\lambda_{Y1}$ are corrected by using the average shift of the wavelength shift $\Delta\lambda_X$ of the X direction and the wavelength shift $\Delta\lambda_Y$ of the Y direction in Step S102 in FIG. 6. However, the present invention is not limited thereto, and the initial peak wavelengths $\lambda_{X1}$ and $\lambda_{Y1}$ may be corrected by setting them to the average wavelength of the detected peak wavelengths $\lambda_{X2}$ and $\lambda_{Y2}$.

In the above-described embodiment, whether a strain is produced is determined by comparing the wavelength shift $\Delta\lambda_X$ of the X direction and the wavelength shift $\Delta\lambda_Y$ of the Y direction in Step S104 of FIG. 6. However, the present invention is not limited thereto. For example, when the peak wavelengths $\lambda_{X2}$ and $\lambda_{Y2}$ of the respective particle array directions are detected in Step S102, whether a strain is produced may be determined by comparing the peak wavelengths $\lambda_{X2}$ of the X direction with the peak wavelength $\lambda_{Y2}$ of the Y direction. In this configuration, it is determined that a strain is produced when the peak wavelengths $\lambda_{X2}$ of the X direction and the peak wavelength $\lambda_{Y2}$ of the Y direction are different from each other.

In addition to the above, the detailed configuration and the detailed operation of the components of the strain sensor can be suitably changed without departing from the features of the present invention.

Although embodiments of the present invention have been described and illustrated in detail, it is clearly understood that the same is by way of illustration and example only and not limitation, the scope of the present invention should be interpreted by terms of the appended claims.

Japanese patent application No. 2016-208252 filed on Oct. 25, 2016, including description, claims, drawings, and abstract the entire disclosure is incorporated herein by reference in its entirety.

What is claimed is:

1. A strain sensor, comprising:
   a marker which is disposed on a surface of a measurement object and which comprises:
   a strain body in which a strain is formed by a load; and
   surface plasmon generating particles which are regularly arranged at same spacings in two directions which are parallel to two in-plane directions of a light receiving surface of the strain body;

a first detector which detects a spectral intensity of a light which has been reflected on the marker or has passed through the marker;

a second detector which detects absorption spectral peaks corresponding to the respective array directions of the particles from the spectral intensity detected by the first detector; and a calculator which calculates the quantity of the strain of the marker based on a difference in wavelength of the two absorption spectral peaks detected by the second detector.

2. The strain sensor according to claim 1, wherein the two directions are perpendicular to each other.

3. The strain sensor according to claim 1, further comprising a light source which emits light toward the marker.

4. The strain sensor according to claim 3, wherein the light source emits the light which is linearly polarized parallel to the array directions of the particles.

5. The strain sensor according to claim 1, wherein the particles contain at least a metal.

6. The strain sensor according to claim 5, wherein the particles contain at least gold or silver.

7. The strain sensor according to claim 1, wherein the particles contain at least an oxide semiconductor.

8. The strain sensor according to claim 7, wherein the particles contain at least zinc oxide.

9. The strain sensor according to claim 1,
wherein the strain body and the measurement object are constituted by transparent bodies, and
wherein the first detector detects the spectral intensity of the light that has passed through the marker.

10. The strain sensor according to claim 1, wherein the strain body is made of an elastic material.

11. The strain sensor according to claim 1, wherein particles are periodically arranged only in the in-plane directions.

12. A non-transitory recording medium storing a computer readable program for a strain sensor that comprises:

a marker which is disposed on a surface of a measurement object and which comprises a strain body in which a strain is formed by a load and surface plasmon generating particles which are regularly arranged at same spacings in two directions which are parallel to two in-plane directions of a light receiving surface of the strain body; and a first detector which detects a spectral intensity of a light which has been reflected on the marker or has passed through the marker, the program making a computer of the strain sensor function as:

a second detector which detects absorption spectral peaks corresponding to the respective array directions of the particles from the spectral intensity detected by the first detector; and a calculator which calculates the quantity of the strain of the marker based on a difference in wavelength of the two absorption spectral peaks detected by the second detector.

13. The non-transitory recording medium according to claim 12, wherein the two directions are perpendicular to each other.

14. The non-transitory recording medium according to claim 12, wherein the strain sensor further comprises a light source which emits light toward the marker.

15. The non-transitory recording medium according to claim 14, wherein the light source emits the light which is linearly polarized parallel to the array directions of the particles.

16. The non-transitory recording medium according to claim 12, wherein the particles contain at least a metal.

17. The non-transitory recording medium according to claim 16, wherein the particles contain at least gold or silver.

18. The non-transitory recording medium according to claim 12, wherein the particles contain at least an oxide semiconductor.

19. The non-transitory recording medium according to claim 18, wherein the particles contain at least zinc oxide.

20. The non-transitory recording medium according to claim 12,
wherein the strain body and the measurement object are constituted by transparent bodies, and
wherein the first detector detects the spectral intensity of the light that has passed through the marker.

* * * * *